(12) United States Patent
Frieberg et al.

(10) Patent No.: US 11,824,186 B2
(45) Date of Patent: Nov. 21, 2023

(54) PRELITHIATED NEGATIVE ELECTRODES INCLUDING LI—SI ALLOY PARTICLES AND METHODS OF MANUFACTURING THE SAME

(71) Applicant: GM GLOBAL TECHNOLOGY OPERATIONS LLC, Detroit, MI (US)

(72) Inventors: Bradley R. Frieberg, Farmington Hills, MI (US); Nicole Ellison, Madison Heights, MI (US); Xiaosong Huang, Novi, MI (US); Zhongyi Liu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 17/221,099

(22) Filed: Apr. 2, 2021

(65) Prior Publication Data

US 2022/0320489 A1   Oct. 6, 2022

(51) Int. Cl.
| | |
|---|---|
| *H01M 4/36* | (2006.01) |
| *H01M 4/04* | (2006.01) |
| *H01M 4/134* | (2010.01) |
| *H01M 4/62* | (2006.01) |
| *H01M 10/0525* | (2010.01) |
| *H01M 4/02* | (2006.01) |

(52) U.S. Cl.
CPC ......... *H01M 4/364* (2013.01); *H01M 4/0416* (2013.01); *H01M 4/134* (2013.01); *H01M 4/622* (2013.01); *H01M 4/625* (2013.01); *H01M 10/0525* (2013.01); *H01M 2004/027* (2013.01)

(58) Field of Classification Search
CPC .... H01M 4/364; H01M 4/0416; H01M 4/134; H01M 4/622; H01M 4/625; H01M 10/0525; H01M 2004/027
See application file for complete search history.

(56) References Cited

U.S. PATENT DOCUMENTS

| | | |
|---|---|---|
| 8,440,350 B1 | 5/2013 | Verbrugge et al. |
| 8,859,144 B2 | 10/2014 | Xiao |
| 8,999,584 B2 | 4/2015 | Jiang et al. |
| 9,005,811 B2 | 4/2015 | Xiao et al. |
| 9,093,705 B2 | 7/2015 | Xiao et al. |
| 9,142,830 B2 | 9/2015 | Xiao et al. |
| 9,287,586 B1 * | 3/2016 | Cheng ............... H01M 10/0525 |
| 9,302,914 B2 | 4/2016 | Liu et al. |
| 9,362,551 B2 | 6/2016 | Sachdev et al. |

(Continued)

FOREIGN PATENT DOCUMENTS

| | | |
|---|---|---|
| CN | 115207283 A | 10/2022 |
| DE | 102022105205 A1 | 10/2022 |

OTHER PUBLICATIONS

Jilin Longshun (Chemical Information Sheet) (Year: 2022).*
"Methods of Forming Prelithiated Silicon Alloy Electroactive Materials", U.S. Appl. No. 16/706,351, filed Dec. 6, 2019.

*Primary Examiner* — Brian R Ohara
*Assistant Examiner* — Emily Elizabeth Freeman
(74) *Attorney, Agent, or Firm* — Harness, Dickey & Pierce, P.L.C.

(57) ABSTRACT

In a method of making a negative electrode for an electrochemical cell of a secondary lithium battery, a precursor mixture is prepared that includes electrochemically active Li—Si alloy particles, electrically conductive carbon particles, and an inert polymer binder dissolved in a nonpolar organic solvent.

20 Claims, 2 Drawing Sheets

(56) References Cited

U.S. PATENT DOCUMENTS

| | | |
|---|---|---|
| 9,379,374 B2 | 6/2016 | Liu et al. |
| 9,531,004 B2 | 12/2016 | Xiao et al. |
| 9,564,639 B2 | 2/2017 | Huang |
| 9,570,752 B2 | 2/2017 | Huang et al. |
| 9,577,251 B2 | 2/2017 | Xiao et al. |
| 9,780,361 B2 | 10/2017 | Xiao et al. |
| 10,062,898 B2 | 8/2018 | Xiao |
| 10,164,245 B2 | 12/2018 | Huang |
| 10,854,882 B2 | 12/2020 | Halalay et al. |
| 10,868,307 B2 | 12/2020 | Huang |
| 10,985,363 B2 | 4/2021 | Xiao et al. |
| 11,228,037 B2 | 1/2022 | Huang et al. |
| 11,349,119 B2 | 5/2022 | Halalay et al. |
| 2009/0117461 A1* | 5/2009 | Shembel .............. H01M 4/0411 429/231.95 |
| 2014/0166939 A1* | 6/2014 | Park ..................... H01M 4/386 252/502 |
| 2018/0205114 A1 | 7/2018 | Pauric et al. |
| 2019/0074508 A1* | 3/2019 | Ha ....................... H01M 4/483 |
| 2020/0194776 A1* | 6/2020 | Kawasaki ......... H01M 10/0525 |
| 2020/0212444 A1* | 7/2020 | Lee ................. H01M 10/0569 |
| 2021/0242450 A1* | 8/2021 | Jang ..................... H01M 4/386 |
| 2022/0173385 A1* | 6/2022 | Jang ..................... H01M 4/405 |
| 2022/0238885 A1 | 7/2022 | Koestner et al. |
| 2022/0246906 A1* | 8/2022 | Koposov ............... H01M 4/622 |
| 2022/0320489 A1 | 10/2022 | Frieberg et al. |

* cited by examiner

PRELITHIATED NEGATIVE ELECTRODES INCLUDING LI—SI ALLOY PARTICLES AND METHODS OF MANUFACTURING THE SAME

INTRODUCTION

The present invention relates to negative electrodes of secondary lithium batteries and, more particularly, to methods of manufacturing prelithiated electroactive materials for negative electrodes of secondary lithium batteries and to methods of manufacturing negative electrodes for secondary lithium batteries including the prelithiated electroactive materials.

Secondary lithium batteries generally include one or more electrochemical cells having a negative electrode, a positive electrode, and an ionically conductive electrolyte that provides a medium for the conduction of lithium ions through the electrochemical cell between the negative and positive electrodes. The negative and positive electrodes are electrically isolated from one another within the electrochemical cell and may be spaced apart from one another by a porous polymeric separator. At the same time, the negative and positive electrodes are electrically connected to one another outside the electrochemical cell via an external circuit. In practice, each of the negative and positive electrodes is typically carried on a metallic current collector and is connected to the external circuit via its respective current collector. The negative and positive electrode materials are formulated so that, when the battery is at least partially charged, an electrochemical potential difference is established between the negative and positive electrodes within the electrochemical cell.

During battery discharge, the electrochemical potential established between the negative and positive electrodes drives spontaneous reduction-oxidation (redox) reactions within the electrochemical cell and the release of lithium ions and electrons at the negative electrode. The released lithium ions travel from the negative electrode (or anode) to the positive electrode (or cathode) through the ionically conductive electrolyte, and the electrons travel from the negative electrode to the positive electrode via the external circuit, which generates an electric current. After the negative electrode has been partially or fully depleted of lithium, the electrochemical cell may be recharged by connecting the negative and positive electrodes to an external power source, which drives nonspontaneous redox reactions within the electrochemical cell and the release of the lithium ions and the electrons from the positive electrode.

The energy density of a battery is a measurement of the amount of energy the battery can store per unit of mass and is determined collectively by the electrochemical potential difference between the negative and positive electrode materials (increasing the potential difference increases the amount of energy the battery can produce) and the specific capacity of the negative and positive electrode materials, i.e., the amount of charge that the electrode materials can store per unit of mass. In a secondary lithium battery, the specific capacity of the negative and positive electrode materials corresponds to the amount of active lithium in the negative and positive electrode materials that is available to participate in the necessary redox reactions occurring within the electrochemical cells during charging and discharging of the battery. In other words, the amount of "active" lithium in the negative and positive electrode materials is the amount of lithium that can be stored in and subsequently released from the negative and positive electrode materials during repeated charging and discharging cycles of the battery.

The amount of active lithium present in a secondary lithium battery after initial assembly, however, may be reduced during initial charging of the battery and during repeated cycling of the battery. For example, during initial charging of a secondary lithium battery, an electrically insulating and ionically conductive layer referred to as a solid electrolyte interphase (SEI) may inherently form in-situ on a surface of the negative electrode at an interface between the negative electrode and the electrolyte. This native SEI is believed to inherently form due to the low reduction potential of the electrochemically active material of the negative electrode, which promotes reduction of the electrolyte at the surface of the negative electrode material. However, the chemical reactions between the negative electrode material and the electrolyte that occur during formation of the SEI are believed to be parasitic and may consume active lithium, which may lead to irreversible capacity loss and may decrease the cycle life of the battery.

Silicon (Si) is a promising electrochemically active negative electrode material for secondary lithium batteries due to its low electrochemical potential (about 0.06 V vs. Li/Li$^+$) and its high theoretical specific capacity (about 4200 mAh/g). The practical application of silicon as a negative electrode material, however, is currently limited by the amount of active lithium consumed during initial charging of the battery due to SEI formation, as well as by the large change in volume silicon-based negative electrodes inherently experience during charging and discharging of the battery, e.g., up to about 300%. For example, the inherent volume changes experienced by silicon-based negative electrodes during repeated battery cycling may undermine the stability of the SEI, potentially leading to cracks or gaps in the SEI. These cracks or gaps may disrupt the electrically insulating barrier function of the SEI and may lead to further lithium-consuming chemical reactions between the electrolyte and the exposed surfaces of the silicon-based negative electrode. As such, when silicon is used as a negative electrode material in a secondary lithium battery, active lithium may be continuously consumed even after initial SEI formation due to repeated exposure of the negative electrode material to the electrolyte and the inherent in-situ formation of new SEI material along exposed surfaces of the negative electrode.

To compensate for the loss of active lithium during battery cycling, a stoichiometric excess of lithium may be incorporated into electrochemical cells of secondary lithium batteries.

SUMMARY

A method of making a negative electrode for an electrochemical cell of a secondary lithium battery is disclosed. A precursor mixture may be prepared that includes electrochemically active particles, electrically conductive carbon particles, and a polymer binder dissolved in a nonpolar organic solvent. The electrochemically active particles include lithium-silicon (Li—Si) alloy particles. The precursor mixture may be deposited on a surface of a metal substrate to form a precursor layer thereon. At least a portion of the nonpolar organic solvent may be removed from the precursor layer to form a negative electrode layer on the surface of the substrate.

The Li—Si alloy particles may comprise a lithium-silicon (Li—Si) alloy represented by a formula $Li_{4.4-x}Si$, where $0 \leq x \leq 0.85$.

The Li—Si alloy particles may exhibit a core-shell structure including a core made of the Li—Si alloy and a shell surrounding the core made of a solid ionically conductive and electrically insulating material.

The Li—Si alloy particles may exhibit a mean particle diameter in a range of 2 nanometers to 20 micrometers.

The polymer binder may comprise at least one of styrene butyl rubber, styrene-butadiene-styrene, carboxymethyl cellulose, polyvinylidene fluoride, polyvinyl butyral, or polyvinyl pyrrolidone.

The nonpolar organic solvent may not include a hydroxyl group, an amide group, a carboxyl group, a carbonyl group, or an amino group.

The nonpolar organic solvent may comprise at least one of toluene or dioxolane.

The nonpolar organic solvent may constitute, by weight, 20-80% of the precursor mixture.

The electrochemically active particles may include the Li—Si alloy particles and particles of at least one of silicon or graphite.

The electrically conductive carbon particles may comprise at least one of carbon black, graphene nanoplatelets, carbon nanofibers, or carbon nanotubes.

The electrochemically active particles may constitute, by weight, 60-96% of the negative electrode layer, the electrically conductive carbon particles may constitute, by weight, less than 20% of the negative electrode layer, and the polymer binder may constitute, by weight, greater than 0% and less than 20% of the negative electrode layer.

In the method, the porosity of the negative electrode layer may be reduced by subjecting the negative electrode layer to a calendaring process. Prior to calendaring, the negative electrode layer may exhibit a porosity in a range of 50-70%. After calendaring, the negative electrode layer may exhibit a porosity in a range of 20-50%.

In the method, at least a portion of the polymer binder may be pyrolyzed to form an electrically conductive carbon matrix throughout the negative electrode material layer.

The substrate may comprise a copper foil.

A method of making a negative electrode for an electrochemical cell of a secondary lithium battery is disclosed. A precursor mixture may be prepared that includes electrochemically active particles, electrically conductive carbon particles, and a polymer binder dispersed in a nonpolar organic solvent. The electrochemically active particles may include lithium-silicon (Li—Si) alloy particles. The precursor mixture may be deposited on a surface of a metal substrate to form a precursor layer thereon. At least a portion of the nonpolar organic solvent may be removed from the precursor layer to form a negative electrode layer on the surface of the metal substrate. At least a portion of the polymer binder may be pyrolyzed to form an electrically conductive carbon matrix throughout the negative electrode layer.

The polymer binder may not include a carboxyl group, a sulfate group, a carbonyl group, an aldehyde group, a hydroxyl group, an acrylate group, an imide group, or an amide group.

The polymer binder may comprise at least one of styrene butyl rubber, styrene-butadiene-styrene, carboxymethyl cellulose, polyvinylidene fluoride, polyvinyl butyral, or polyvinyl pyrrolidone.

The nonpolar organic solvent may not include a hydroxyl group, an amide group, a carboxyl group, a carbonyl group, or an amino group.

At least a portion of the polymer binder may be pyrolyzed by heating the negative electrode layer at a temperature in a range of 300° C. to about 900° C.

A negative electrode for an electrochemical cell of a secondary lithium battery is provided. The negative electrode may comprise a negative electrode layer disposed on a surface of a metal substrate. The negative electrode layer may include a matrix phase and a particulate phase dispersed throughout the matrix phase. The matrix phase may include a polymer binder or solid thermal decomposition products from pyrolysis of the polymer binder. When present, the polymer binder may be made of at least one of styrene butyl rubber, styrene-butadiene-styrene, carboxymethyl cellulose, polyvinylidene fluoride, polyvinyl butyral, or polyvinyl pyrrolidone.

The particulate phase of the negative electrode layer may comprise electrochemically active lithium-silicon (Li—Si) alloy particles and electrically conductive carbon particles.

The matrix phase may account for, by weight, greater than 0% and less than 20% of the negative electrode layer, the particulate phase may account for, by weight, greater than 80% of the negative electrode layer, and the electrochemically active Li—Si alloy particles may account for, by weight, 60-96% of the negative electrode layer after formation of the negative electrode layer on the surface of the metal substrate.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed negative electrode precursor compositions include particles of a highly chemically reactive lithium-silicon (Li—Si) alloy in a mixture with a polymer binder dissolved in an organic solvent. The precursor compositions can be used to form negative electrode layers for secondary lithium batteries and electrochemical cells of secondary lithium batteries that include a stoichiometric surplus of lithium in their negative electrodes prior to initial battery charging.

The polymer binder and the organic solvent of the presently disclosed negative electrode precursor compositions are formulated to be inert and/or nonreactive with respect to the Li—Si alloy particles to prevent undesirable chemical reactions from with the Li—Si alloy particles during formation of the negative electrode layers. To accomplish this, the organic solvent used to prepare the precursor compositions may be a nonpolar chemical compound that is free of functional groups that pose a risk of reacting with the Li—Si alloy particles in a manner that would alter their chemical composition and/or physical structure. In addition, the polymer binder is selected as an inert chemical compound that exhibits good solubility in the nonpolar organic solvent, does not include reactive functional groups, and allows for the formation of negative electrode layers on metal current collectors of secondary lithium batteries that include a homogenous distribution of Li—Si alloy particles.

After the negative electrode layers are formed, the polymer binder may be thermally decomposed or pyrolyzed to form a substantially continuous electrically conductive carbon matrix throughout the negative electrode layers. The pyrolyzed electrically conductive carbon matrix may produce a more robust and more comprehensive electrically conductive network between the Li—Si alloy particles and the metal current collectors on which the negative electrode layers are formed, as compared to negative electrode layers that include a polymer binder matrix that has not been pyrolyzed. The pyrolyzed electrically conductive carbon matrix may improve the electrochemical performance of the negative electrode layers, for example, by increasing the number of Li—Si alloy particles within the layers that are available to participate in the electrochemical redox reactions of the electrochemical cell, which may improve capacity retention.

Figure 1:
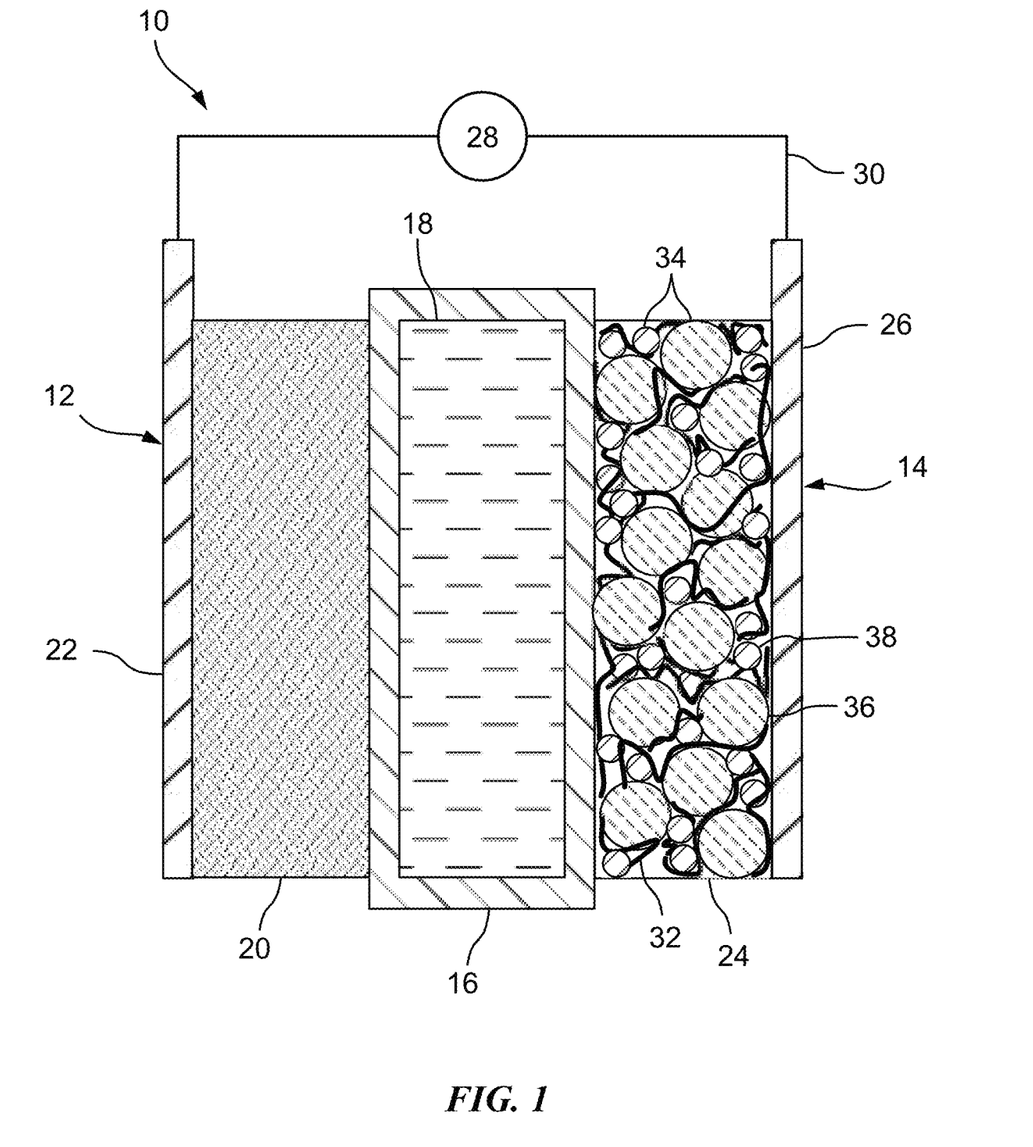
FIG. 1 is a schematic side cross-sectional view of an electrochemical cell for a secondary lithium battery, including a positive electrode, a negative electrode, a porous separator disposed between the positive and negative electrodes, and an ionically conductive electrolyte that provides a medium for the conduction of lithium ions through the electrochemical cell between the positive and negative electrodes, wherein the negative electrode includes electrochemically active lithium-silicon (Li—Si) alloy particles.

FIG. 1 depicts a schematic side cross-sectional view of an electrochemical cell 10 that may be included in a secondary lithium battery. The electrochemical cell 10 includes a positive electrode 12, a negative electrode 14, a porous separator 16 disposed between the positive and negative electrodes 12, 14, and an ionically conductive electrolyte 18 infiltrating the positive and negative electrodes 12, 14 and the porous separator 16. The positive electrode 12 includes a positive electrode material layer 20 disposed on a major surface of a positive electrode current collector 22, and the negative electrode 14 includes a negative electrode material layer 24 disposed on a major surface of a negative electrode current collector 26. In practice, the positive and negative electrode current collectors 22, 26 may be electrically coupled to a power source or load 28 via an external circuit 30.

The porous separator 16 electrically isolates the positive and negative electrodes 12, 14 from each other and may be in the form of a microporous ionically conductive and electrically insulating film or non-woven material, e.g., a manufactured sheet, web, or matt of directionally or randomly oriented fibers. In embodiments, the porous separator 16 may comprise a microporous polymeric material, e.g., a microporous polyolefin-based membrane or film. For example, the porous separator 16 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the porous separator 16 may comprise a laminate of one or more polymeric materials, such as a laminate of PE and PP.

The electrolyte 18 provides a medium for the conduction of lithium ions through the electrochemical cell 10 between the positive and negative electrodes 12, 14 and may be in the form of a liquid, solid, or gel. For example, the electrolyte 18 may comprise a nonaqueous liquid electrolyte solution including one or more lithium salts dissolved in a nonaqueous aprotic organic solvent or a mixture of nonaqueous aprotic organic solvents. Examples of lithium salts include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluoro(oxalato)borate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. Examples of nonaqueous aprotic organic solvents include alkyl carbonates, for example, cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof. In embodiments where the electrolyte 18 is in the form of a solid, the electrolyte 18 may function as both an electrolyte and a separator and may eliminate the need for a discrete separator 16.

The positive electrode material layer 20 includes one or more electrochemically active materials that can undergo a reversible redox reaction with lithium at a higher electrochemical potential than the electrochemically active material of the negative electrode material layer 24 such that an electrochemical potential difference exists between the positive and negative electrode material layers 20, 24. For example, the positive electrode material layer 20 may comprise a material that can sufficiently undergo lithium intercalation and deintercalation, alloying and dealloying, or plating and stripping. In one form, the positive electrode material layer 20 may comprise an intercalation host material that can undergo the reversible insertion or intercalation of lithium ions. In such case, the intercalation host material may comprise a layered oxide represented by the formula LiMeO$_2$, an olivine-type oxide represented by the formula LiMePO$_4$, a spinel-type oxide represented by the formula LiMe$_2$O$_4$, a favorite represented by one or both of the following formulas LiMeSO$_4$F or LiMePO$_4$F, or a combination thereof, where Me is a transition metal (e.g., Co, Ni, Mn, Fe, Al, V, or a combination thereof). In another form, the positive electrode material layer 20 may comprise a conversion material including a component that can undergo a reversible electrochemical reaction with lithium, in which the component undergoes a phase change or a change in crystalline structure accompanied by a change in oxidation state. In such case, the conversion material may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of metals for inclusion in the conversion material include iron, manganese, nickel, copper, and cobalt.

The electrochemically active material of the positive electrode material layer 20 may be intermingled with a polymer binder to provide the layer 20 with structural integrity. Examples of polymer binders for inclusion in the positive electrode material layer 20 include polyvinylidene fluoride (PVdF), polytetrafluoroethylene (PTFE), ethylene propylene diene monomer (EPDM) rubber, styrene butadiene rubber (SBR), carboxymethyl cellulose (CMC), nitrile butadiene rubber (NBR), styrene-butadiene rubber (SBR), polyacrylates, alginates, polyacrylic acid, and mixtures thereof. The positive electrode material layer 20 optionally may include particles of an electrically conductive material. Examples of electrically conductive materials include carbon-based materials, metals (e.g., nickel), and/or electrically conductive polymers. Examples of electrically conductive carbon-based materials include carbon black (e.g., acetylene black), graphite, graphene (e.g., graphene nanoplatelets), carbon nanotubes, and/or carbon fibers (e.g., carbon nanofibers). Examples of electrically conductive polymers include polyaniline, polythiophene, polyacetylene, and/or polypyrrole.

The positive and negative electrode current collectors 22, 26 are electrically conductive and provide an electrical connection between the external circuit 30 and their respective positive and negative electrode material layers 20, 24. The positive and negative electrode current collectors 22, 26 may be in the form of nonporous metal foils, perforated metal foils, porous metal meshes, or a combination thereof. The positive electrode current collector 22 may be formed from aluminum (Al) or another appropriate electrically conductive material. The negative electrode current collector 26 may be made of copper, nickel, or alloys thereof, stainless steel, or other appropriate electrically conductive material.

The negative electrode material layer 24 includes particles of an electrochemically active material that facilitates the storage and release of lithium ions from the negative electrode material layer 24 by undergoing a reversible redox reaction with lithium during charging and discharge of the electrochemical cell 10. For example, the negative electrode material layer 24 may comprise particles of one or more electrochemically active materials that can act as a lithium "host" material by undergoing lithium intercalation and deintercalation, alloying and dealloying, or plating and stripping. In embodiments, the electrochemically active material of the negative electrode material layer 24 includes a silicon-based material. As an electrochemically active material, silicon (Si) can facilitate the storage of lithium in the negative electrode material layer 24 during charging of the electrochemical cell 10 by forming an alloy with lithium. During discharge of the electrochemical cell 10, lithium ions can be released from the negative electrode material layer 24 by dealloying from silicon. The term "silicon-based," as used herein with respect to the electrochemically active material of the negative electrode material layer 24, broadly includes materials in which silicon is the single largest constituent on a weight percentage (%) basis. This may include materials having, by weight, greater than 50% silicon, as well as those having, by weight, less than 50% silicon, so long as silicon is the single largest constituent of the material. The electrochemically active material of the negative electrode material layer 24 may comprise—in addition to silicon—carbon (e.g., graphite, activated carbon, carbon black, and/or graphene), tin oxide, aluminum, indium, zinc, germanium, titanium oxide, and/or lithium titanate.

The negative electrode material layer 24 is configured to provide the electrochemical cell 10 with a stoichiometric surplus of lithium prior to initial charging of the electrochemical cell 10 and includes particles of a lithiated (or lithium-containing) electrochemically active material. As shown in FIG. 1, prior to initial charging of the electrochemical cell 10, the negative electrode material layer 24 exhibits a composite structure including a matrix phase 32 and a particulate phase 34 dispersed throughout the matrix phase 32. The matrix phase 32 is made of a polymer binder and/or the solid thermal decomposition products of a pyrolyzed polymer binder. The particulate phase 34 includes electrochemically active material particles 36 and electrically conductive particles 38. The matrix phase 32 may account for, by weight, greater than or equal to 0% or 2%, less than 20% or 4%, or between 0-20% or 2-4% of the negative electrode material layer 24. The particulate phase 34 may account for, by weight, greater than or equal to 60% or 80%, less than or equal to 96% or 90%, or between 60-96% or 80-90% of the negative electrode material layer 24. The electrochemically active material particles 36 may account for, by weight, greater than or equal to 60% or 80%, less than or equal to 96% or 90%, or between 60-96% or 80-90% of the negative electrode material layer 24.

The polymer binder of the matrix phase 32 provides structural support to the electrochemically active material particles 36 and the electrically conductive particles 38 of the particulate phase 34. The polymer binder may comprise an inert polymeric chemical compound that can effectively bind the particles 36, 38 together without interfering with the electrochemical activity of the Li—Si alloy particles. For example, the polymer binder may comprise an inert polymeric chemical compound that does not include functional groups that may react with lithium in the Li—Si alloy particles in a manner that alters the chemical composition and/or physical structure of the Li—Si alloy particles. Examples of inert polymer binders for the matrix phase 32 include styrene butyl rubber (SBR), styrene-butadiene-styrene (SBS), carboxymethyl cellulose (CMC), polyvinylidene fluoride (PVDF), polyvinyl butyral (PVB), and/or polyvinyl pyrrolidone (PVP).

The electrochemically active material particles 36 of the particulate phase 34 include lithium-silicon (Li—Si) alloy particles and optionally may include particles of one or more additional electrochemically active negative electrode materials, e.g., graphite, silicon (Si), tin (Sn), silicon-containing compounds, and/or tin-containing compounds, such as SiSn, SiSnFe, SiSnAl, SiFeCo, SnO$_2$, and/or SiO$_2$. In some embodiments, the electrochemically active material particles 36 of the particulate phase 34 may consist essentially of the Li—Si alloy particles. As shown in FIG. 1, in embodiments, the Li—Si alloy particles of the particulate phase 34 may consist essentially of particles of an Li—Si alloy without overlying coatings or layers.

The Li—Si alloy particles of the particulate phase 34 may comprise particles of a lithium-silicon (Li—Si) alloy represented by the formula $Li_{4.4x}Si$, where 0≤x≤0.85. For example, the Li—Si alloy particles may comprise, on an atomic basis (at. %), greater than 0% or 30%, less than 82% or 70%, or between 0-82% or 30-70% lithium. At the same time, the Li—Si alloy particles may comprise, on an atomic basis (at. %), greater than 18% or 30%, less than 100% or 70%, or between 18-100% or 30-70% silicon. The Li—Si alloy particles may be substantially round solid particles having a mean particle diameter of greater than or equal to about 2 nanometers and less than or equal to about 20 micrometers. In embodiments, the Li—Si alloy particles may have a mean particle diameter of greater than or equal to about one micrometer and less than or equal to about 20 micrometers. Li—Si alloy particles and methods of making Li—Si alloy particles are described in U.S. patent application Ser. No. 16/706,351 filed on Dec. 6, 2019 entitled "Methods of Forming Prelithiated Silicon Alloy Electroactive Materials," the contents of which are incorporated herein by reference in their entirety.

Without intending to be bound by theory, it is believed that the Li—Si alloy particles of the particulate phase 34 contain active lithium and, when included in the negative electrode material layer 24, effectively provide the electrochemical cell 10 with a stoichiometric surplus of lithium prior to initial charging of the electrochemical cell 10. In other words, after assembly of the electrochemical cell 10, the lithium in the Li—Si alloy particles may be released from the Li—Si alloy particles and participate in the electrochemical redox reactions occurring within the electrochemical cell 10 during discharge and recharge of the electrochemical cell 10. As such, including the Li—Si alloy particles in the negative electrode material layer 24 during initial assembly of the electrochemical cell 10 can compensate for the subsequent loss of active lithium in the electrochemical cell 10, which may occur as a result of parasitic reactions between elemental lithium metal and the electrolyte 18 during cycling of the electrochemical cell 10.

The electrically conductive particles 38 facilitate the transport of electrons between the electrochemically active material particles 36 (e.g., the Li—Si alloy particles) of the negative electrode material layer 24 and the negative electrode current collector 26 during cycling of the electrochemical cell 10. The electrically conductive particles 38 may comprise particles of a carbon-based material, metal particles (e.g., powdered nickel), and/or an electrically conductive polymer. Examples of electrically conductive carbon-based materials include carbon black (e.g., acetylene black), graphite, graphene (e.g., graphene nanoplatelets), carbon nanotubes, and/or carbon fibers (e.g., carbon nanofibers). Examples of electrically conductive polymers include polyaniline, polythiophene, polyacetylene, and/or polypyrrole. The electrically conductive particles 38 may have a mean particle diameter in a range of 2 nanometers to 20 micrometers. The electrically conductive particles 38 may account for, by weight, greater than 0% or 5%, less than 20% or 15%, or between 0-20% or 5-15%, of the negative electrode material layer 24.

Figure 2:
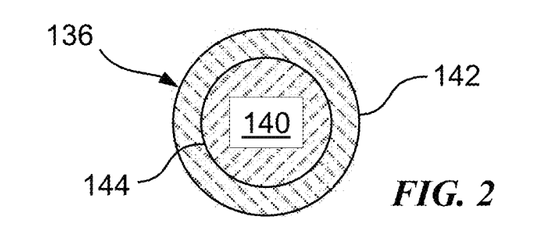
FIG. 2 is a schematic cross-sectional view of a Li—Si alloy particle having a core-shell structure that includes a core made of an Li—Si alloy particle and a shell surrounding the core made of a solid ionically conductive and electrically insulating material.

As shown in FIG. 2, in embodiments, the particulate phase 34 of the negative electrode material layer 24 may comprise composite Li—Si alloy particles 136 that exhibit a core-shell structure including a core 140 and a shell 142 surrounding the core 140. The core 140 may be solid and may consist essentially of an alloy of lithium (Li) and silicon (Si), i.e., a Li—Si alloy. Like the Li—Si alloy particles discussed above, the Li—Si alloy of the core 140 may be represented by the formula $Li_{4.4x}Si$, where 0≤x≤about 0.85. For example, the Li—Si alloy of the core 140 may comprise, on an atomic basis (at. %), greater than 0% or 30%, less than 82% or 70%, or between 0-82% or 30-70% lithium. At the same time, the Li—Si alloy of the core 140 may comprise, on an atomic basis (at. %), greater than 18% or 30%, less than 100% or 70%, or between 18-100% or 30-70% silicon. The core 140 may be substantially round and may have a mean particle diameter of greater than or equal to about 2 nanometers and less than or equal to about 20 micrometers. In embodiments, the core 140 may have a mean particle diameter of greater than or equal to about one micrometer and less than or equal to about 20 micrometers.

In the composite Li—Si alloy particles 136, the core 140 may be entirely encapsulated by the shell 142, meaning that the shell 142 may extend over an entire outer surface 144 of the core 140. The shell 142 may have a thickness in the range of one nanometer to 100 nanometers above the outer surface 144 of the core 140. The core 140 may account for, by weight, about 99% to about 99.99% of the composite Li—Si alloy particles 136, and the shell 142 may account for, by weight, about 0.01% to less than about 1% of the composite Li—Si alloy particles 136.

The shell 142 may be made of a solid ionically conductive and electrically insulating material, referred to herein as a solid electrolyte material. The shell 142 may be in the form of a single substantially homogenous layer, or the shell 142 may comprise more than one layer of material on the outer surface 144 of the core 140. In embodiments where the shell 142 exhibits a multilayered structure (not shown), the shell 142 may comprise a first layer of solid electrolyte material formed directly on the outer surface 144 of the core 140 and a second layer of a carbon-based material formed on the outer surface 144 of the core 140 over the first layer.

The solid electrolyte material of the shell 142 provides a passivation layer on the outer surface 144 of the core 140 that helps prevent the Li—Si alloy of the core 140 from participating in undesirable chemical reactions with other chemical compounds in the electrochemical cell 10 and/or during manufacture of the negative electrode material layer 24 and/or the electrochemical cell 10. At the same time, the solid electrolyte material of the shell 142 is formulated to exhibit high ionic conductivity, and thus does not inhibit the electrochemical activity of the Li—Si alloy of the core 140 during cycling of the electrochemical cell 10.

The solid electrolyte material of the shell 142 may comprise one or more inorganic lithium (Li)-, phosphorus (P)-, and sulfur (S)-containing compounds referred to herein as lithium thiophosphates (LPS). For example, the solid electrolyte material may comprise a lithium thiophosphate represented by the formula $Li_{4-x}P_xS_4$, wherein 0<x≤3. In some embodiments, the solid electrolyte material comprises a lithium thiophosphate represented by the formula $Li_3PS_4$. The solid electrolyte material of the shell 142 may exhibit an ionic conductivity in a range of about $3 \times 10^{-7}$ S/cm to about $1.6 \times 10^{-4}$ S/cm at room temperature (e.g., about 25° C.).

Figure 3:
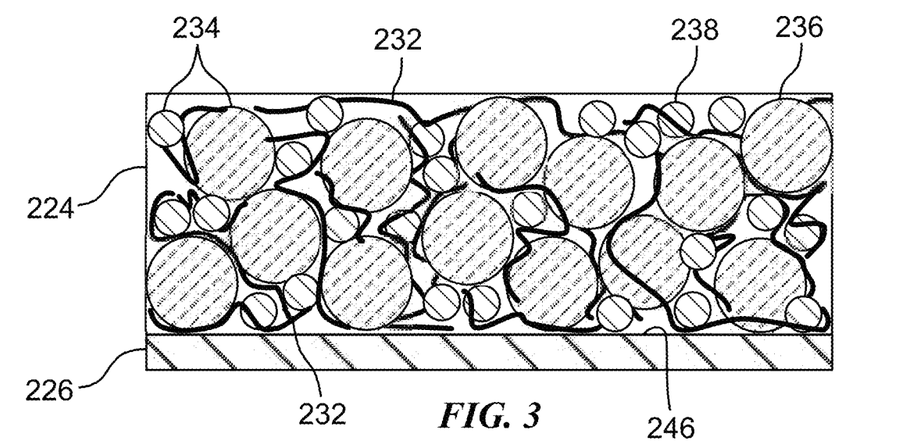
FIG. 3 is a schematic cross-sectional view of a negative electrode material including a matrix phase and a particulate phase dispersed throughout the particulate phase, wherein the matrix phase comprises a polymeric binder and the particulate phase comprises Li—Si alloy particles and electrically conductive carbon particles.

FIG. 3 depicts a negative electrode material layer 224 formed on a major surface 246 of a substrate 226. The negative electrode material layer 224 may be used in the manufacture of an electrochemical cell of a secondary lithium battery, such as the electrochemical cell 10 of FIG. 1. The negative electrode material layer 224 is similar in many respects to the negative electrode material layer 24 depicted in FIG. 1, and a description of common subject matter generally may not be repeated here. The negative electrode material layer 224 exhibits a composite structure including a matrix phase 232 and a particulate phase 234 dispersed throughout the matrix phase 232. The matrix phase 232 is made of a polymer binder and the particulate phase 234 includes a plurality of electrochemically active Li—Si alloy particles 236 and electrically conductive particles 238. The substrate 226 may comprise the same material as that of the negative electrode current collector 26, e.g., the substrate 226 may comprise a copper foil.

The negative electrode material layer 224 may be formed on the major surface 246 of the substrate 226 by preparing a slurry or precursor mixture including a homogenous mixture of the electrochemically active Li—Si alloy particles 236, the electrically conductive particles 238, a polymer binder, and a solvent. The electrochemically active Li—Si alloy particles 236 may consist essentially of particles of an Li—Si alloy, as discussed above with respect to FIG. 1, and/or the electrochemically active Li—Si alloy particles 236 may comprise composite Li—Si alloy particles 136, as discussed above with respect to FIG. 2. The electrically conductive particles 238 may comprise the same electrically conductive materials as that of the electrically conductive particles 38.

The polymer binder and the solvent are selected to facilitate formation of a homogenous negative electrode material layer 224 on the major surface 246 of the substrate 226, without altering with the electrochemical activity, composition, and/or physical structure of the electrochemically active Li—Si alloy particles 236. As such, the solvent may comprise a nonpolar organic solvent that is free of (i.e., does not include) functional groups that may react with lithium in the Li—Si alloy particles 236 in a manner that alters the chemical composition and/or physical structure of the Li—Si alloy particles 236. For example, the nonpolar organic solvent preferably is a chemical compound that does not include a functional group with a lone pair of electrons (e.g., nitrogen, oxygen, phosphorus, and sulfur atoms) that can act as an electron donor or hydrogen bond acceptor. Polar functional groups that are preferably excluded from the nonpolar organic solvent include: hydroxyl groups (—OH), amide groups (—C(=O)N=), carboxyl groups (—C(=O)OH), carbonyl groups (—C=O), carboxylic ester groups (—C(=O)OR, where R is an alkyl or aryl group), nitrile groups (—C≡N), and/or amino groups (—NH₂, —NHR, or —NRR'). Examples of polar organic solvents that are preferably excluded from the precursor mixture include alcohols (e.g., methanol, ethanol, and/or propanol), ketones (e.g., acetone), carboxylic esters (e.g., ethyl acetate and/or butyl acetate), acetonitrile, formamide, N-methylformamide, N,N-dimethylformamide, N,N-diethylformamide, acetamide, N-methylacetamide, N,N-dimethylacetamide, N,N-dipropylacetamide, N,N-dimethyl benzoic acid amide, caprolactam, N-methylcaprolactam, N-ethylcaprolactam, N-isopropylcaprolactam, N-isobutylcaprolactam, N-n-propylcaprolactam, N-n-butylcaprolactam, N-cyclohexylcaprolactam, 2-pyrrolidone, N-methyl-2-pyrrolidone, N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethyl-2-piperidone, and 5-methyl-2-pyrrolidone.

Examples of nonpolar organic solvents that may be used to prepare the precursor mixture include toluene, dioxolane, pentane, hexane, cyclohexane, benzene, chloroform, dimethoxyethane, dimethyl ether, and diethyl ether. In embodiments, the nonpolar organic solvent used to prepare the precursor mixture may include toluene, dioxolane, or a mixture thereof. The nonpolar organic solvent may be present in the precursor mixture in an amount constituting, by weight, greater than or equal to 20% or 50%, less than or equal to 80% or 70%, or between 20-80% or 50-70% of the precursor mixture.

The polymer binder may comprise an inert polymeric, oligomeric, or monomeric chemical compound that exhibits good solubility in the selected nonpolar organic solvent and can form a robust adhesive bond with the surface 246 of the substrate 226 and with the Li—Si alloy particles 236 and the electrically conductive particles 238. The polymer binder preferably is free of (i.e., does not include) polar functional groups that may react with lithium in the Li—Si alloy particles 236 in a manner that alters the chemical composition and/or physical structure of the Li—Si alloy particles 236. In addition, the polymer binder preferably is free of (i.e., does not include) hydrophilic or hygroscopic polar functional groups that may absorb and/or retain water molecules. For example, the polymer binder preferably does not include a carboxyl group (—C(=O)OH), a sulfate group (—O—SO₃), a carbonyl group (—CO—), an aldehyde group (—CHO), a hydroxyl group (—OH), an acrylate group (CH₂=CHCOO—), an imide group (—(O=C)—N—(C=O)—), and/or an amide group (—C(=O)—N=). Examples of polymer binders that are preferably excluded from the precursor mixture include polyacrylic acids, polyvinyl alcohol, polyimides, polyamides, polyacrylates, polymethacrylates, polyvinyl acetate, and perfluorosulfonates.

Examples of inert polymer binders that may be used to prepare the precursor mixture include styrene-butadiene rubber (SBR), styrene-butadiene-styrene (SBS), carboxymethyl cellulose (CMC), polyvinylidene fluoride (PVDF), polyvinyl butyral (PVB), and/or polyvinyl pyrrolidone (PVP).

In embodiments where the electrochemically active Li—Si alloy particles 236 are in the form of composite Li—Si alloy particles 136 that include a shell 142 made of a solid electrolyte material, the solid electrolyte material of the shell 142 may effectively shield the Li—Si alloy of the core 140 from interacting with the polymer binder and the solvent in the precursor mixture during formation of the negative electrode material layer 224. In such case, the selection of polymer binders and/or solvents that may be used to prepare the precursor mixture may not be limited to the nonpolar, nonreactive, and/or inert polymer binders and/or solvents discussed above.

The precursor mixture may be deposited on the surface 246 of the substrate 226 to form a precursor layer thereon. The precursor mixture may be deposited on the surface 246 of the substrate 226 by spreading or casting the precursor mixture on the surface 246 of the substrate 226, for example, using a doctor blade, a slot die coater, or other suitable deposition technique. The precursor mixture may be deposited on the surface 246 of the substrate 226 in a relatively low humidity environment, e.g., in an environment having less than 0.1 ppm oxygen ($O_2$) and/or water ($H_2O$).

After formation of the precursor layer on the surface 246 of the substrate 226, at least a portion of the solvent may be removed from the precursor layer to form the negative electrode material layer 224. The solvent may be removed from the precursor layer by evaporating at least a portion of the solvent from the precursor layer in a room temperature environment (e.g., about 25° C.), by heating the precursor layer at a temperature greater than 25° C. and less than 300° C., at atmospheric pressure (e.g., 1 Atm), and/or in a vacuum or subatmospheric environment (e.g., less than 1 Atm).

After removal of the solvent, the negative electrode material layer 224 may exhibit a porosity of greater than or equal to 50% or 55%, less than or equal to 70% or 65%, or between 50-70% or 55-65%. After removal of the solvent, the negative electrode material layer 224 may exhibit a thickness in a range of 40 micrometers to 100 micrometers. In embodiments, the negative electrode material layer 224 may be compressed by being subjected to a pressing or so-called "calendaring" process. After calendaring, the negative electrode material layer 224 may exhibit a porosity of greater than or equal to 20% or 25%, less than or equal to 50% or 45%, or between 20-50% or 25-45%. After calendaring, the negative electrode material layer 224 may exhibit thickness in a range of 20 micrometers to 60 micrometers.

After calendaring, in some embodiments, the negative electrode material layer 224 may be heated to pyrolyze (i.e., thermally decompose) the polymer binder, without negatively impacting the remaining components of the negative electrode material layer 224 or the substrate 226. For example, the negative electrode material layer 224 may be heated at a temperature in a range of about 300° C. to about 900° C. to pyrolyze the polymer binder. The temperature required to pyrolyze the polymer binder will, of course, depend upon the specific chemical composition of the polymer binder and upon the composition of the other components of the negative electrode material layer 224 and the substrate 226. Pyrolysis of the polymer binder may be performed in an inert gas environment, e.g., in a gaseous environment of nitrogen ($N_2$) and/or argon (Ar), and/or in a vacuum or subatmospheric environment (e.g., less than 1 Atm).

Figure 4:
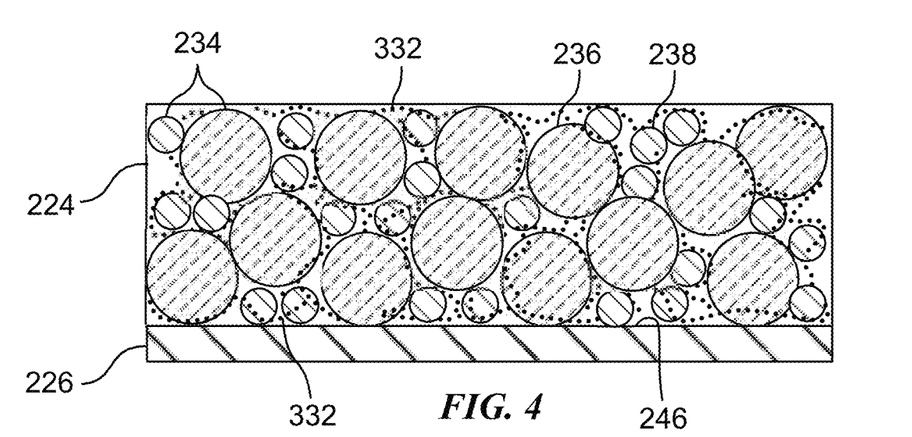
FIG. 4 is a schematic cross-sectional view of the negative electrode material of FIG. 3 after pyrolysis of the polymer binder and transformation of the polymer binder matrix phase into an electrically conductive carbon matrix phase.

As shown in FIG. 4, after pyrolysis of the polymer binder, the negative electrode material layer 224 may include a matrix phase 332 that is made up of the thermal decomposition products of the polymer binder. For example, the matrix phase 332 may comprise fine-grained particles of carbon or of a carbon-based material, which may be electrically conductive. As such, pyrolysis of the polymer binder may result in the formation of a fine-grained electrically conductive matrix phase 332 throughout the negative electrode material layer 224. In comparison to the polymer binder matrix phase 232, the fine-grained electrically conductive matrix phase 332 may create a relatively robust, comprehensive electrically conductive network between the electrochemically active Li—Si alloy particles 236 and the substrate 226 (e.g., the current collector) on which the negative electrode material layer 224 is disposed. As such, in practice, the fine-grained electrically conductive matrix phase 332 may improve the electrochemical performance of the negative electrode material layer 224 by increasing the number of electrochemically active Li—Si alloy particles 236 within the layer 224 that are able to participate in the electrochemical redox reactions occurring within the cell 10 during operation, which may improve the capacity retention thereof.

The negative electrode material layer 224 and the substrate 226 may be cut or punched into a desired size and shape prior to being incorporated into an electrochemical cell 10 of a secondary lithium battery. Cutting of the negative electrode material layer 224 and the substrate 226 may be performed after calendaring and either before or after pyrolysis of the polymer binder.

These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method of making a negative electrode for a secondary lithium battery, the method comprising:

preparing a precursor mixture including electrochemically active particles, electrically conductive carbon particles, and a polymer binder dissolved in a nonpolar organic solvent, wherein the electrochemically active particles comprise lithium-silicon (Li—Si) alloy particles, the polymer binder and the nonpolar organic solvent are nonreactive with the Li—Si alloy particles, the polymer binder is soluble in the nonpolar organic solvent, the Li—Si alloy particles have a core-shell structure comprising a core made of a lithium-silicon (Li—Si) alloy and a shell surrounding the core, the core of each of the Li—Si alloy particles comprises, on an atomic basis, 30% to 70% lithium and 30% to 70% silicon, and the shell of each of the Li—Si alloy particles comprises a solid ionically conductive and electrically insulating material comprising a lithium thiophosphate;

depositing the precursor mixture on a surface of a metal substrate to form a precursor layer thereon; and removing at least a portion of the nonpolar organic solvent from the precursor layer to form a negative electrode layer on the surface of the metal substrate.

2. The method of claim 1 wherein the Li—Si alloy particles exhibit a mean particle diameter in a range of 2 nanometers to 20 micrometers.

3. The method of claim 1 wherein the polymer binder does not include a carboxyl group, a sulfate group, a carbonyl group, an aldehyde group, a hydroxyl group, an acrylate group, an imide group, or an amide group.

4. The method of claim 3 wherein the polymer binder comprises at least one of styrene butyl rubber, styrene-butadiene-styrene, carboxymethyl cellulose, polyvinylidene fluoride, polyvinyl butyral, or polyvinyl pyrrolidone.

5. The method of claim 4 wherein the nonpolar organic solvent does not include a hydroxyl group, an amide group, a carboxyl group, a carbonyl group, or an amino group.

6. The method of claim 5 wherein the nonpolar organic solvent comprises at least one of toluene or dioxolane.

7. The method of claim 1 wherein the nonpolar organic solvent constitutes, by weight, 20-80% of the precursor mixture.

8. The method of claim 1 wherein the electrochemically active particles include the Li—Si alloy particles and particles of at least one of silicon or graphite, and wherein the electrically conductive carbon particles comprise at least one of carbon black, graphene nanoplatelets, carbon nanofibers, or carbon nanotubes.

9. The method of claim 1 wherein the electrochemically active particles constitute, by weight, 60-96% of the negative electrode layer, the electrically conductive carbon particles constitute, by weight, less than 20% of the negative electrode layer, and the polymer binder constitutes, by weight, greater than 0% and less than 20% of the negative electrode layer.

10. The method of claim 1 further comprising:
pyrolyzing at least a portion of the polymer binder to form an electrically conductive carbon matrix throughout the negative electrode layer.

11. A method of making a negative electrode for a secondary lithium battery, the method comprising:
preparing a precursor mixture including electrochemically active particles, electrically conductive carbon particles, and a polymer binder dispersed in a nonpolar organic solvent, wherein the electrochemically active particles comprise lithium-silicon (Li—Si) alloy particles, the polymer binder and the nonpolar organic solvent are nonreactive with the Li—Si alloy particles, the polymer binder is soluble in the nonpolar organic solvent, the Li—Si alloy particles have a core-shell structure comprising a core made of a lithium-silicon (Li—Si) alloy and a shell surrounding the core, the core of each of the Li—Si alloy particles comprises, on an atomic basis, 30% to 70% lithium and 30% to 70% silicon, and the shell of each of the Li—Si alloy particles comprises a solid ionically conductive and electrically insulating material comprising a lithium thiophosphate;
depositing the precursor mixture on a surface of a metal substrate to form a precursor layer thereon;
removing at least a portion of the nonpolar organic solvent from the precursor layer to form a negative electrode layer on the surface of the metal substrate; and
pyrolyzing at least a portion of the polymer binder to form an electrically conductive carbon matrix throughout the negative electrode layer.

12. The method of claim 11 wherein the polymer binder does not include a carboxyl group, a sulfate group, a carbonyl group, an aldehyde group, a hydroxyl group, an acrylate group, an imide group, or an amide group, and wherein the polymer binder comprises at least one of styrene butyl rubber, styrene-butadiene-styrene, carboxymethyl cellulose, polyvinylidene fluoride, polyvinyl butyral, or polyvinyl pyrrolidone.

13. The method of claim 11 wherein the nonpolar organic solvent does not include a hydroxyl group, an amide group, a carboxyl group, a carbonyl group, or an amino group, and wherein the nonpolar organic solvent comprises at least one of toluene or dioxolane.

14. The method of claim 11 wherein at least a portion of the polymer binder is pyrolyzed by heating the negative electrode layer at a temperature in a range of 300° C. to about 900° C.

15. A negative electrode of a secondary lithium battery, the negative electrode comprising:
a negative electrode layer disposed on a surface of a metal substrate, the negative electrode layer including a matrix phase and a particulate phase dispersed throughout the matrix phase,
wherein the matrix phase includes:
a polymer binder made of at least one of styrene butyl rubber, styrene-butadiene-styrene, carboxymethyl cellulose, polyvinylidene fluoride, polyvinyl butyral, or polyvinyl pyrrolidone, or
solid thermal decomposition products from pyrolysis of the polymer binder,
wherein the particulate phase comprises electrochemically active lithium-silicon (Li—Si) alloy particles and electrically conductive carbon particles, the Li—Si alloy particles defining a core-shell structure including a core made of a lithium-silicon (Li—Si) alloy and a shell surrounding the core, the core of each of the Li—Si alloy particles comprising, on an atomic basis, 30% to 70% lithium and 30% to 70% silicon, and the shell of each of the Li—Si alloy particles comprising a lithium thiophosphate represented by the formula $Li_{4-x}P_xS_4$, where x is greater than 0 and less than or equal to 3,
wherein the lithium in the Li—Si alloy particles is electrochemically active and can participate in electrochemical redox reactions occurring within the secondary lithium battery during discharge and charge thereof, and
wherein the matrix phase accounts for, by weight, greater than 0% and less than 20% of the negative electrode layer, the particulate phase accounts for, by weight, greater than 80% of the negative electrode layer, and the electrochemically active Li—Si alloy particles account for, by weight, 60-96% of the negative electrode layer after formation of the negative electrode layer on the surface of the metal substrate.

16. The negative electrode of claim 15 wherein the core of each of the Li—Si alloy particles exhibits a mean particle diameter in a range of 2 nanometers to 20 micrometers, and wherein the shell accounts for, by weight, 0.01% to less than 1% of the Li—Si alloy particles.

17. The negative electrode of claim 16 wherein the shell comprises a lithium thiophosphate represented by the formula $Li_3PS_4$.

18. The method of claim 1 wherein the precursor mixture is deposited on the surface of the metal substrate in a low humidity environment comprising less than 0.1 ppm oxygen and less than 0.1 ppm water.

19. The method of claim 1 wherein the shell of each of the Li—Si alloy particles comprises a lithium thiophosphate represented by the formula $Li_{4-x}P_xS_4$, where x is greater than 0 and less than or equal to 3.

20. The method of claim 1 wherein the shell of each of the Li—Si alloy particles comprises a lithium thiophosphate represented by the formula $Li_3PS_4$.

* * * * *